(12) United States Patent
Tyukasz et al.

(10) Patent No.: US 8,086,740 B2
(45) Date of Patent: *Dec. 27, 2011

(54) METHOD AND APPARATUS FOR REMOTELY CONTROLLING A COMPUTER WITH PEER-TO-PEER COMMAND AND DATA TRANSFER

(75) Inventors: Gabor Tyukasz, Lakitelek (HU); Marton B. Anka, Budapest (HU)

(73) Assignee: LogMeIn, Inc., Woburn, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/497,888

(22) Filed: Jul. 6, 2009

(65) Prior Publication Data
US 2010/0005180 A1      Jan. 7, 2010

Related U.S. Application Data

(63) Continuation of application No. 11/009,590, filed on Dec. 9, 2004, now Pat. No. 7,558,862.

(51) Int. Cl.
*G06F 15/16* (2006.01)

(52) U.S. Cl. ........ 709/227; 709/228; 709/229; 709/230; 709/245; 709/249

(58) Field of Classification Search .................. None
See application file for complete search history.

(56) References Cited

U.S. PATENT DOCUMENTS

| | | | |
|---|---|---|---|
| 5,586,257 A | 12/1996 | Perlman | |
| 6,704,786 B1* | 3/2004 | Gupta et al. | 709/228 |
| 6,928,479 B1 | 8/2005 | Meyer et al. | |
| 6,938,076 B2 | 8/2005 | Meyer et al. | |
| 7,130,888 B1 | 10/2006 | Hickman et al. | |
| 7,380,011 B2* | 5/2008 | Li et al. | 709/227 |
| 7,441,270 B1* | 10/2008 | Edwards et al. | 709/227 |
| 2003/0112823 A1* | 6/2003 | Collins et al. | 370/474 |
| 2003/0221009 A1* | 11/2003 | Standridge et al. | 709/227 |
| 2004/0003247 A1 | 1/2004 | Fraser et al. | |
| 2004/0139228 A1* | 7/2004 | Takeda et al. | 709/245 |
| 2004/0148406 A1* | 7/2004 | Shima | 709/228 |
| 2005/0071481 A1 | 3/2005 | Danieli | |
| 2005/0076128 A1* | 4/2005 | Tsai | 709/227 |
| 2006/0039356 A1 | 2/2006 | Rao et al. | |
| 2006/0075127 A1* | 4/2006 | Juncker et al. | 709/229 |
| 2007/0157303 A1 | 7/2007 | Pankratov | |
| 2008/0052400 A1* | 2/2008 | Ekberg | 709/227 |
| 2008/0201480 A1* | 8/2008 | He et al. | 709/227 |

OTHER PUBLICATIONS

Takeda, "Symmetric NAT Traversal Using STUN," Jun. 2003, published by Internet Engineer Task Force, Internet Working Draft , 23 pages.

* cited by examiner

*Primary Examiner* — Patrice Winder
(74) *Attorney, Agent, or Firm* — David H. Judson

(57) ABSTRACT

A remote access session is established between client and host computers with the assistance of a gateway. The gateway requests the host computer to send a plurality of data packets to different external addresses and monitors the network ports used for these outgoing packets. The gateway then uses the network port information to predict which port the host will use to transmit future outgoing data packets. A similar process is performed on the client computer. The gateway then directs the client computer to send further data packets to the network address and the predicted port of the host computer. Similarly, the host computer is directed to send further data packets to the network address and predicted port of the client computer. The computers are then directly connected together so that further data communications bypass the gateway.

7 Claims, 5 Drawing Sheets

METHOD AND APPARATUS FOR REMOTELY CONTROLLING A COMPUTER WITH PEER-TO-PEER COMMAND AND DATA TRANSFER

FIELD OF THE INVENTION

This invention relates to remote access systems that allow a host computer to be accessed and controlled by a client computer via a network.

BACKGROUND OF THE INVENTION

In many situations, users have computer systems to which they must have constant access. A typical example is an office computer system that may have important files or sophisticated software running on it. This computer may be part of an office system or network that is not generally accessible outside of the office. However, the user may still want to use this computer when the user is at home or traveling. The solution is a remote access system that allows the user to connect to the office computer from another remote computer over a network, generally the Internet. Once connected, the user can enter keyboard and mouse commands into the remote computer and the commands will be transmitted to, and processed by, the office computer just as if the user had entered the commands into the office computer. Similarly, screen displays generated at the office computer are transmitted to, and reproduced by, the remote computer.

In traditional remote access solutions there are two components: the "host computer" (the computer being accessed) and the "client computer" (the computer used to access the host). The terms "host" and "client" can also be used to refer to the respective components of the remote access software. For example, host software runs on the host computer and client software runs on the client computer. The host software accepts a connection over a network, such as the Internet, from the client software, and after an initial authentication phase, a remote access session begins.

During a remote access session, the client computer can reproduce the screen display generated by the host. The client computer can also relay mouse and keyboard input for execution on the host computer. In addition, the client computer usually provides a user interface for accessing, manipulating and transferring files on the two systems that take part in the session.

In order to operate properly, a remote access system must be able to efficiently transfer information between the client and host computers and this efficient transfer requires a stable connection. If the client and host computers are directly connected to the network with static network addresses, establishing this stable connection is relatively easy. However, firewalls and NAT (Network Address Translation) routers that change or mask network addresses are becoming increasingly common, and dynamic network addresses are typically assigned to home users who access the Internet. Therefore, setting up a traditional remote access system in which the client computer directly contacts the host computer is not always practical as the difficulty of the task often exceeds the technical capabilities of the user.

In order to solve this problem, remote access systems introduce a third component, called a "gateway" that is connected to the network. The gateway is usually a combination of hardware and software that receives incoming connections over the network from both the client computer and the host computer. The gateway is often a server that is connected to the Internet and is typically located in a datacenter that is off-site for both the host computer and the client computer.

In a gateway-based remote access system, the host computer usually initiates a connection to the gateway, for example, when it boots up and thereafter maintains a constant connection with the gateway. The client computer usually connects to the gateway only when a user action initiates such a connection to begin a remote access session. When the gateway receives a connection request from the client computer, the gateway will authenticate the client computer, called a client "instance" and determine which host computer (called a host instance) the client instance has requested to contact (and which host instances the client instance is allowed to contact). When the requested host instance is identified, then the gateway will forward data between the respective client and host instances. In particular, whenever the host instance wishes to send data to the connected client instance, it sends the data to the gateway instead. Similarly, when the client instance wishes to transmit data to the connected host instance, it sends the data to the gateway. In either case, the gateway receives the incoming data and forwards it to the appropriate recipient.

A gateway solves the problem introduced by firewalls, NAT routers and dynamic network addresses, since neither the client computer nor the host computer attempt to contact each other directly; they both contact the gateway instead. Typically, the gateway is configured so that it is always accessible, usually through a common Internet protocol, such as HTTP or HTTPS. Thus, any computer that is configured to perform simple Internet-related tasks, such as browsing the World Wide Web, can be converted into a host computer and be a remote access target simply by installing and running the remote access host software.

However, there are two drawbacks to this typical prior art approach. First, there is increased data transmission latency. Each data packet traveling between the client computer and the host computer must be routed through the gateway. Since the gateway often is located remotely from both the client and host computers, the extra traveling distance will introduce unwanted delays in packet transit times. Second, the organization responsible for the gateway will incur high bandwidth costs as a large amount of data must travel through their infrastructure. Consequently, it would be beneficial to both the end users operating the client and host computers and the organization providing the gateway if the data flow between the client and host computers could be shifted so it avoids the gateway and travels directly between the client computer and the host computer.

SUMMARY OF THE INVENTION

In accordance with the principles of the invention, a remote access session is established with the assistance of a gateway, but after the session is established, data passes directly between the client computer and the host computer. In one embodiment, when the gateway receives a request from a client computer to establish a remote access session to a host computer, it requests that the host computer send a plurality of data packets to different external addresses and monitors the network ports used for these outgoing packets. Using this network address information, the gateway predicts which port the host will use to transmit future outgoing data packets. A similar process is performed on the client computer to obtain a prediction of the port that the client computer will use to transmit outgoing packets. The gateway then directs the client computer to send further data packets to the network address and the predicted port of the host computer. Similarly, the host computer is directed to send further data packets to the network address and predicted port of the client computer. The computers are then directly connected together so that further data communications bypass the gateway.

In one embodiment, in the event that a direct connection cannot be established between the client and host computers, the gateway also provides a fallback mechanism that simply receives and forwards data between the client computer and the host computer.

In another embodiment, in order to minimize wait time for the user (time that is spent waiting for a successful, or unsuccessful, direct connection) and to maximize the success rate of setting up a direct connection, the gateway begins receiving and forwarding data between the client computer and the host computer, as per the fallback mechanism described above. Once the client and the host are communicating through the gateway, the gateway will try to establish a direct connection between the client and host in the background. The attempts to establish this connection are transparent to the user and do not affect the existing communications channel through the gateway. If a direct connection is successfully established, communications between the client computer and the host computer are then shifted to the new connection and the forwarding channel through the gateway is closed. Since attempts to establish a direct connection occur in the background, they can be repeated indefinitely until a direct connection is successfully established.

In still another embodiment, in addition to trying to establish a direct communications channel between the client and host computers, the gateway will also attempt to establish a more reliable direct connection between the client and host computers, if it determines that the host and client are capable of such communication. For example, this more reliable connection may be attempted if there is a reasonable chance that the client and host are not protected by a NAT router from each other. Alternatively, if either the host or the client is behind a NAT router that has controllable capabilities, the gateway may request that the respective computer attempt to open a port on the NAT router temporarily, until it is determined if a direct connection can be established.

BRIEF DESCRIPTION OF THE DRAWINGS

The above and further advantages of the invention may be better understood by referring to the following description in conjunction with the accompanying drawings in which.

DETAILED DESCRIPTION

Figure 1:
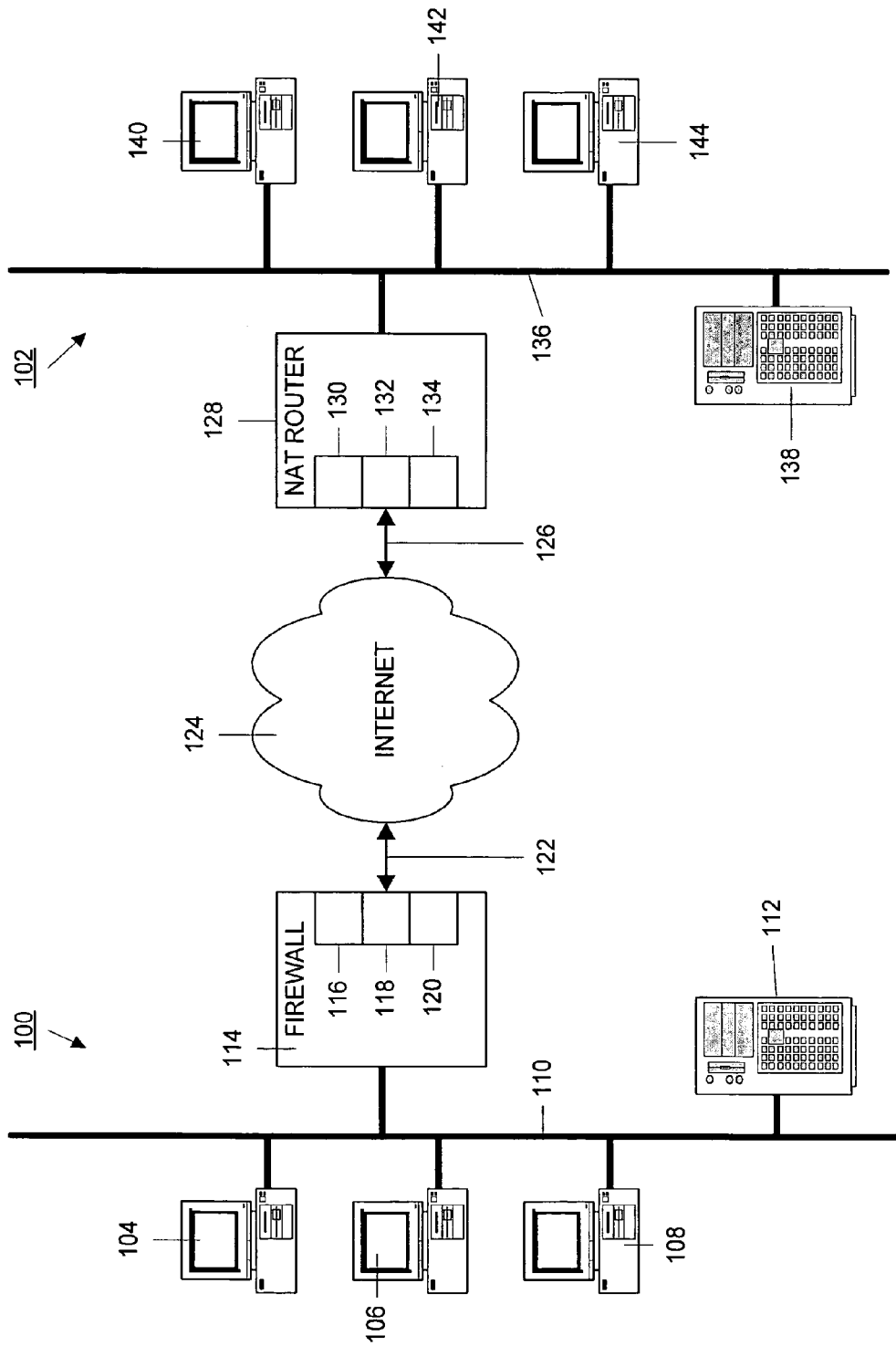
FIG. 1 is a block schematic diagram showing two conventional networks connected to the Internet by a firewall and a NAT router.

FIG. 1 shows a conventional network setup using firewalls and NAT routers. For example, a network 100 is connected by a firewall 114 to the Internet 124 and a network 102 is connected to the Internet 124, via a NAT router 128. The network 100 typically includes a plurality of terminals 104-108 that are connected by a LAN network 110. The network 100 may also be connected to one or more servers 112. The LAN network 110 is, in turn, connected to the Internet 124 by means of a firewall 114. The firewall commonly has connections to the Internet 124 that are schematically illustrated as arrow 122. The firewall 114 is generally a program or hardware device that filters the information coming from the Internet connection 122 into the network 100. If an incoming packet of information is flagged by the filters, it is not allowed through the firewall 114.

In addition, the firewall 114 may have one or more software ports 116-120. Software ports are numbered connections that the firewall 114 uses to separate different types of network traffic. A port may support incoming traffic, outgoing traffic, or both and may be assigned to a specific traffic protocol. A few services, such as File Transfer Protocol (FTP) service, and Hypertext Transfer Protocol (HTTP) service are assigned by default to open ports where operating systems can easily find them easily. A port may be open to allow traffic to pass through it or closed to block traffic. For security reasons, by default, all ports to the Internet, and most LAN ports are closed so that traffic cannot flow through them.

In a similar manner, network 102 is connected by a NAT router 128 to the Internet 124. The network 102 typically includes a plurality of terminals 140-144 that are connected by a LAN network 136. The network 102 may also be connected to one or more servers 138. The NAT router 128 has connections to the Internet 124 that are schematically illustrated as arrow 126. As with the firewall 114, the NAT router 128 may have one or more software ports 130-134.

The NAT router 128 provides address translation that allows the network 102 to use private network addresses (called unregistered or non-routable addresses) without interfering with normal Internet addresses (called registered or routable addresses). The NAT router 128 maps an unregistered network address to a registered network address that is selected from a group of registered network addresses assigned to the router. This mapping may be either fixed or dynamic, in which the mapping is maintained only during a connection between an unregistered and a registered address. The network 102 is usually referred to as a "stub domain" because it uses network addresses internally to identify each of the networked computers. Most of the network traffic in a stub domain is local, that is, it is addressed to other computers attached to the network and the local data packets do not travel outside the network 102. Some stub domains have both computers that are identified by registered addresses and computers that are identified by unregistered network addresses. However, any computers that use unregistered network addresses must use a router that performs network address translation to communicate with the Internet 124.

In order to further extend network address translation capabilities, some NAT routers use a form of dynamic address translation called "overloading" that maps multiple unregistered network addresses to a single registered network address by using different ports to separate the different connection. In particular, when a computer on the stub domain, such as computer 140, attempts to connect to a computer outside the network, such as computer 104, the NAT router 128 receives a data packet from the computer 140 on the stub domain. The data packet contains the non-routable network address that identifies the computer 140. The router 128 saves the non-routable address and a source port number assigned to the computer 140 to an address translation table. The router 128 then replaces the non-routable network address in the data packet with a routable address selected out of a set of routable network addresses that have been assigned to the router 128 and saves the selected routable address to the translation table. The router 128 further replaces the source port number in the data packet with a public source port number that matches the number of the entry in the address translation table where the router saved the non-routable address. The translation table now has a mapping of the non-routable address of computer 140 matched with a routable address. The router then sends the data packet to its destination 104 via the Internet 124.

When a data packet returns from the destination computer 104, the NAT router 128 checks the destination port on the packet. It then retrieves the address translation table entry corresponding to the destination port number to determine to which computer on the stub domain the packet belongs. The router then changes the destination address and destination port in the data packet to the source address and source port in the retrieved entry and sends the data packet to the identified computer.

Since the NAT router 128 now has the source address and source port number of the computer 140 saved to the address translation table, the router 128 will continue to use that same public source port number for the duration of the connection. A timer is reset each time the router 128 accesses an entry in the table. If the entry is not accessed again before the timer expires, the entry is removed from the table. NAT routers provide some security for the local network since no entry will be placed in an address translation table unless a connection was established by a local computer. Incoming data packets that do not have corresponding entries in the address translation table are simply discarded.

As previously mentioned, in a remote access system it would be desirable to transmit data directly between the client and host computers, thereby bypassing the gateway and alleviating the problems with transmitting all data through the gateway. However, both firewalls and NAT routers interfere with this direct transmission. Firewalls may filter out incoming data packets from computers that are external to the network where a connection has not been initiated by a local computer. NAT routers obscure the actual network address of the local computer and discard incoming data packets where the connection has not been initiated by a local computer.

Figure 2:
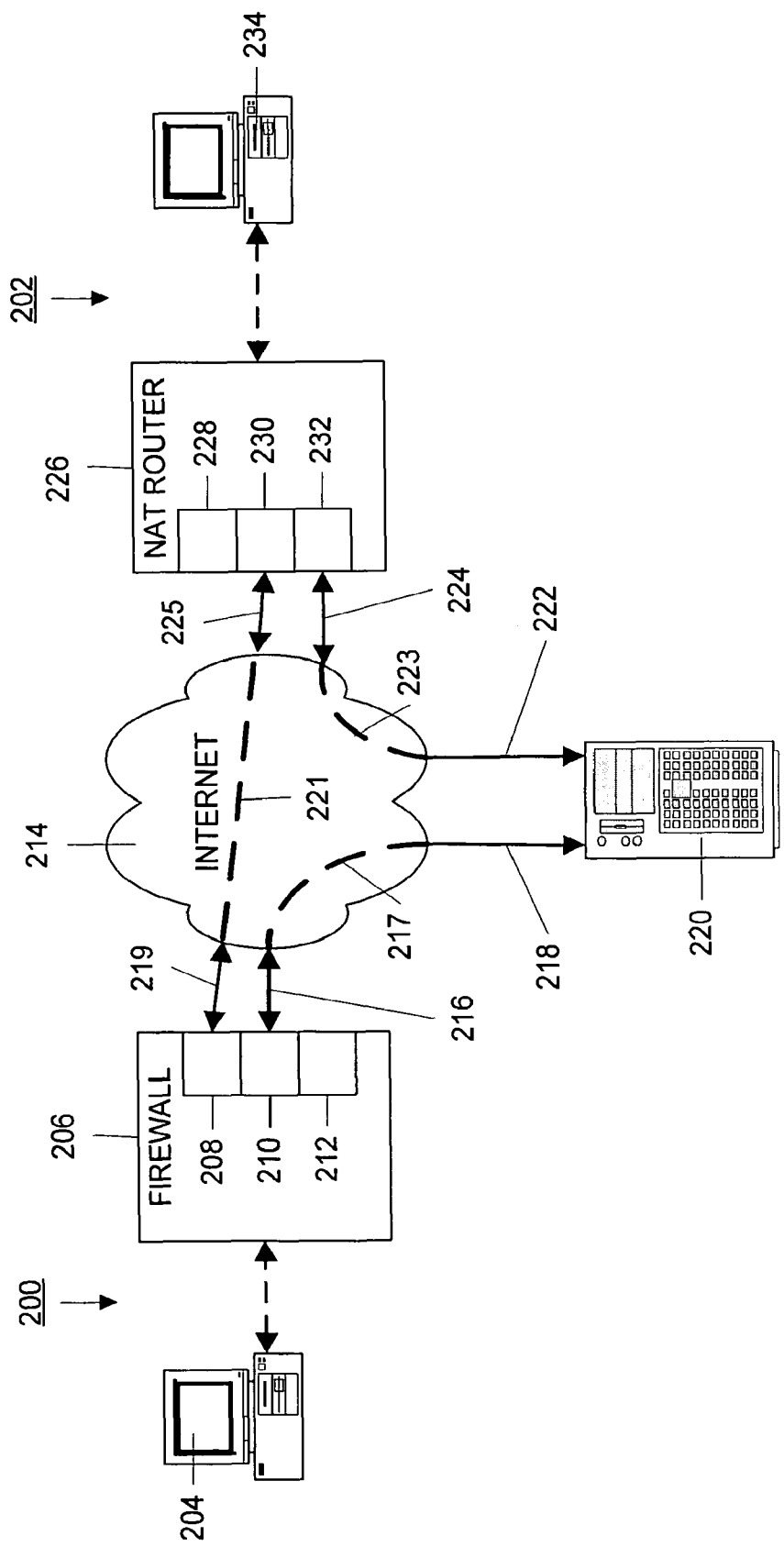
FIG. 2 is a block schematic diagram showing connection paths between a client computer and a host computer during a remote access session in accordance with the invention.
Figure 3A:
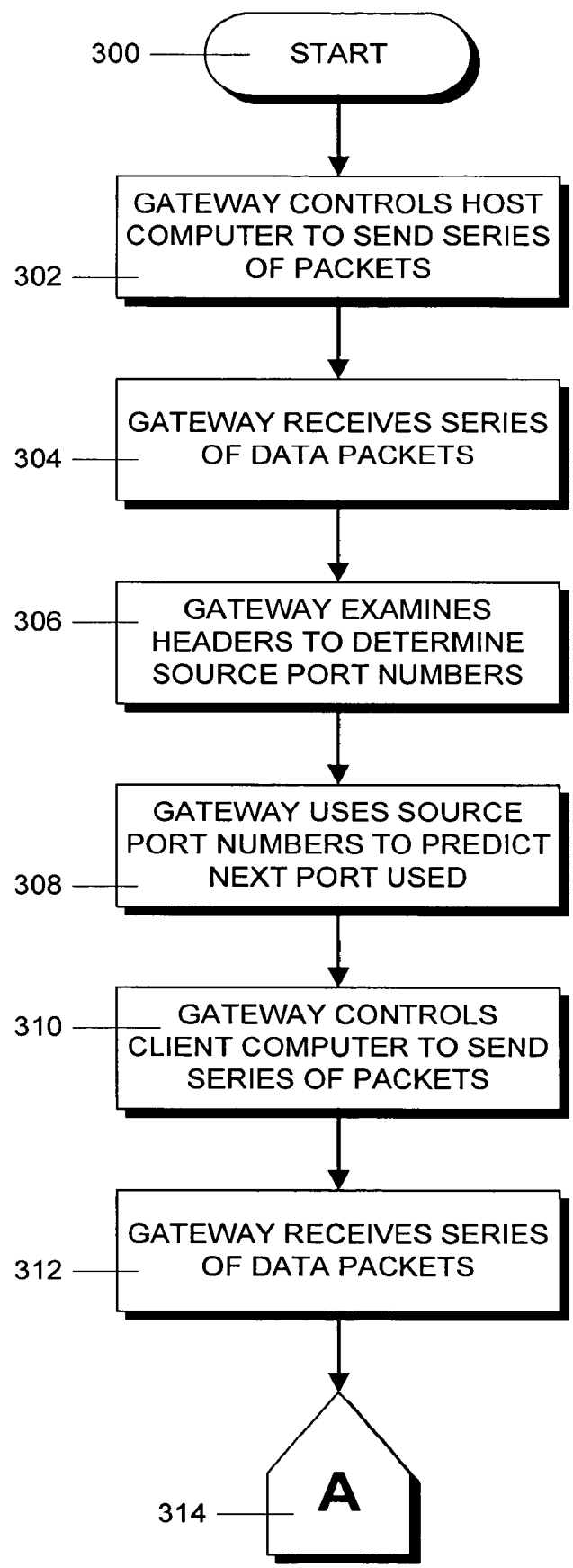
FIGS. 3A-3C, when placed together, form a flowchart showing the steps in an illustrative process for establishing a direct connection between a client computer and a host computer.
Figure 3B:
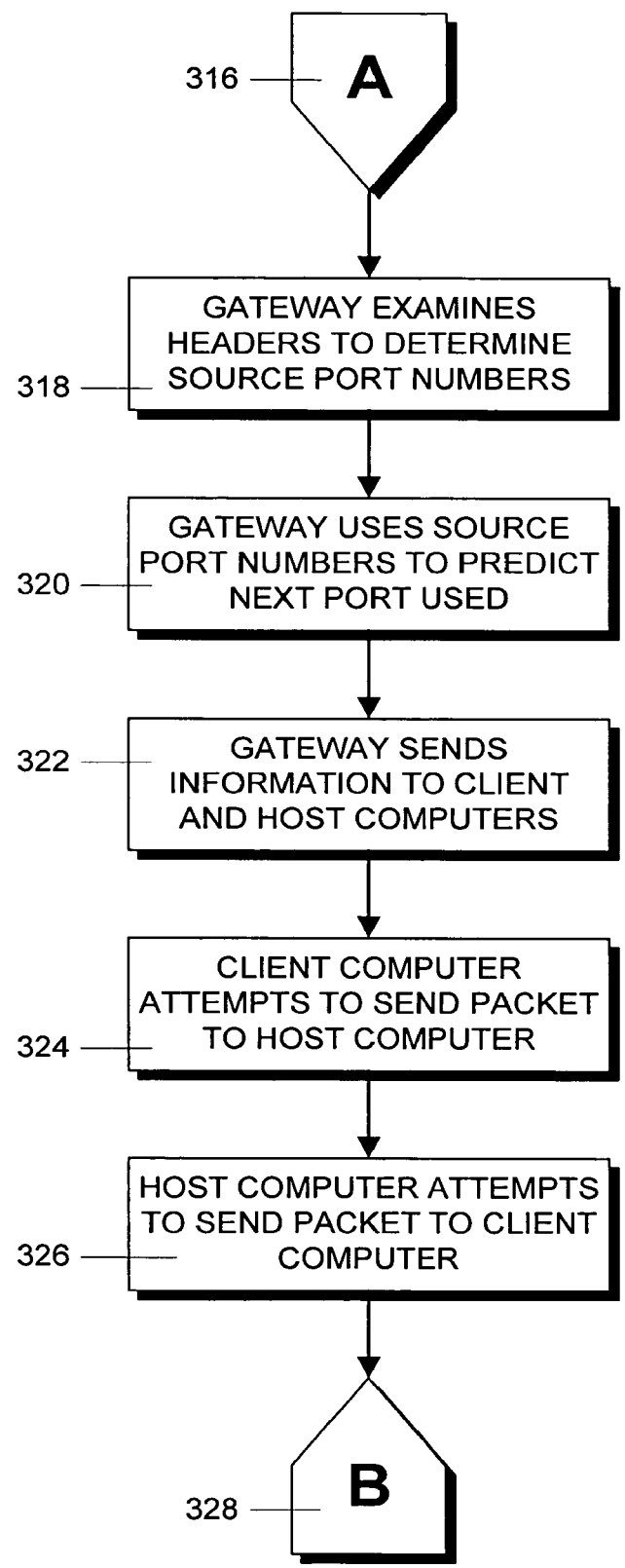
Figure 3C:
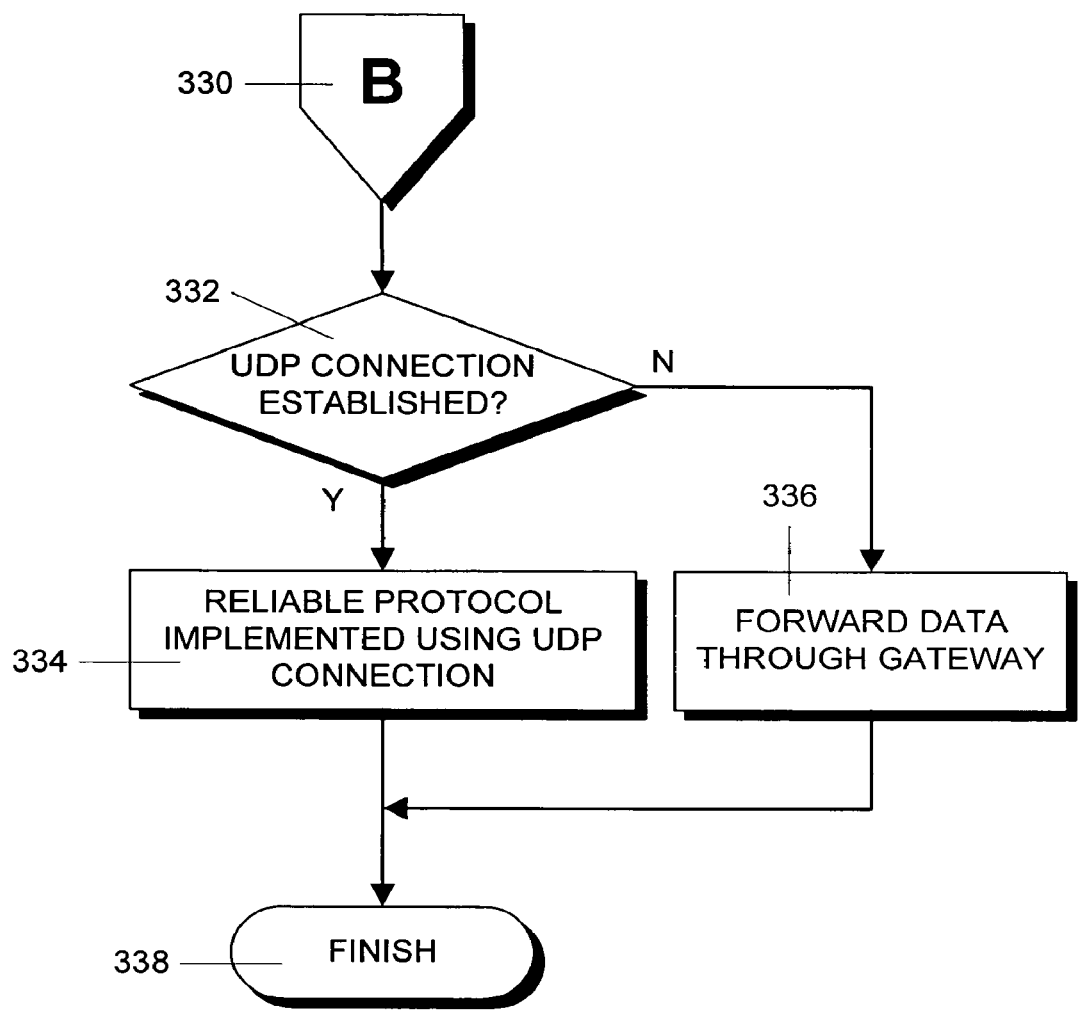

The operation of one embodiment of the invention is shown in FIG. 2 and illustrated in the flowchart shown in FIGS. 3A-3C. In FIG. 2, a client computer 204 is connected by a network 200 to a firewall 206. The details of network 200 could be similar to network 100 shown in FIG. 1, but have been omitted to simplify the drawing. The firewall 206 is connected to the Internet 214 as indicated schematically by arrow 216. In a similar manner, the host computer 234 is connected by a network 202 to a NAT router 226. The details of network 202 could be similar to network 102 shown in FIG. 1, but have been omitted to simplify the drawing. The NAT router 226 is connected to the Internet 214 as indicated schematically by arrow 224.

In accordance with the principles of the invention during a remote access session, a gateway 220 is used to set up a direct connection between the client computer 204 and the host computer 234. The gateway 220 is a combination of hardware and software that receives incoming connections from both the client computer 204 and the host computer 234. As shown in FIG. 2, the gateway 220 often resides at a location that is off-site for both the host computer 204 and the client computer 234, but is reachable by the Internet 214.

The host computer 234 usually continually maintains a connection with the gateway 220. In general, this connection is set up when the host computer 234 logs onto the Internet 214 as illustrated schematically by arrow 224. A connection is set up through the Internet as indicated schematically by arrow 223 to the gateway 220, which is also connected to the Internet 214 as indicated by arrow 222.

The client computer 204 connects to the gateway 220 only when a user at that computer 204 initiates such a connection. In particular, the computer 204 logs onto the Internet 214 as indicated by arrow 216 and then attempts to establish a connection 217 to the gateway 220, which is also connected to the Internet 214 as indicated by arrow 218, and to specify the remote host computer to which it wishes to connect. During the processing of this connection attempt, the gateway 220 will authenticate the client computer 204. After authentication, the gateway 220 will determine which host computer the client computer 204 wishes to contact (and which host computers it is allowed to contact).

If the client computer 204 is allowed to access the host computer that it specifies, the process set forth in FIG. 3 begins in step 300 and proceeds to step 302 when the gateway 220 senses that the client computer 204 and the host computer 234 are about to establish a connection. In step 302, the gateway 220 requests that the host computer 234 send a data packet to each of a set of different network addresses, for example, three different network addresses. These packets are sent using a specific, well-known protocol called the UDP (User Datagram Protocol). The service provided by UDP is an "unreliable" message-oriented service, which provides no guarantees for delivery and no protection from duplication. A computer may send UDP packets without first establishing a connection to the recipient. The computer completes the appropriate fields in the UDP header and forwards the data together with the header for transmission. The UDP header contains both the source network address and port number and the destination network address and port number.

The series of UDP data packets will be sent from one of the network addresses assigned to NAT router 226 and one of the public source ports 228-232. Since every data packet is sent to a different destination network address, the NAT router 226 will assign a different public source port to each packet. The destination network addresses are actually controlled by the gateway 220, either directly or indirectly, so, as set forth in step 304, the gateway 220 can receive these packets. Next, in step 306, the gateway 220 examines the UDP header of each packet to determine the source port from which that packet originated. The data payload of these UDP packets also contains the private source network address and port number as determined by the sender. This information is used, as described below, to determine whether the computer sending the data packets is behind a NAT router or firewall.

Next, in step 308, the gateway 220 examines the source port numbers of the UDP data packets it received from the host computer 234 and tries to predict which source port will be used by the NAT router 226 the next time a UDP packet is transmitted to an external network address.

The exact algorithm for predicting the next source port can vary depending on the process used by the NAT router 226 to assign port numbers. Different NATs use different assignment processes and thus, the prediction process must accommodate these differences. For example, in many NATs, each time the same endpoint, such as host computer 234, sends a data packet to a different external network address, the NAT increments the port number assigned the last time a UDP packet was sent by a fixed amount called a port increment amount. Usually the value of this increment is one, but it may be more than one.

In order to detect an assignment process of this type, the gateway causes the host computer 234 to transmit three UDP data packets to three separate external network addresses via the NAT router 226. The gateway then receives these three different data packets and examines the source address in the packet header to detect the source port number. Assume that these three data packets contain source port numbers A, B and C assigned by NAT router 226. Since, as previously mentioned, once a NAT router has assigned a source port number to the data transmission and stored that number in its internal address translation table, it maintains that mapping for a predefined time period. Since the packets were sent one right after another, it is likely that the three source port numbers will correspond to three sequential source port numbers.

The gateway can then determine whether the port number assignment process uses a fixed port increment and the value of this increment by calculating the numerical difference between address B and address A and between address C and address B. If the differences B−A and C−B are equal, then a fixed port increment is used and the increment is equal to the difference. In this case, the gateway can predict that the next data packet sent to a new destination network address from NAT router 226 will be sent from source port D, where D is equal to the previous port number plus the fixed port increment C−B. Thus, the predicted port number would be C+(C−B).

However, in some cases, the NAT router 226 may assign the same source port number when data packets are sent to different ports of the same network address and a different source port number when data packets are sent to different network addresses. The gateway can determine this assignment process by using more data packets with more destination network addresses on which to base the prediction. For example, five data packets can be transmitted from the host computer 234 through the NAT router 226. Assume that five data packets are transmitted, with the first two packets sent to different port numbers of the same network address, the next two packets are sent to different port numbers of the same network address where this latter network address is different from the first network address and that the fifth data packet is sent to a completely different network address. If the packets as received from the NAT router 226 contain source port numbers A, B, C, D and E. If B−A and D−C are zero and C−B and E−D are equal, then the gateway can predict that the port assignment process is as previously described. In this case, the gateway can predict that the next data packet sent to a new destination network address from NAT router 226 will be sent from source port F, where F is equal to the previous port number plus the fixed port increment C−B. Thus, the predicted port number would be E+(C−B).

There can be several reasons why the prediction fails. For example, it is possible that another endpoint transmitted a data packet through the NAT router 226 during the prediction process. In this happens, the data packets transmitted in response to the gateway request are no longer sequential and the prediction will fail. In addition, a typical NAT router will assign a port number for a new data packet transmission from a specific range of ports. When the router reaches the end of the range, it will jump to the beginning of the range and begin assigning ports from there. If this jump occurs during the prediction process the process will also fail. In addition, if a port range is used, typically a flag is associated with each port number that is currently in use. If the next port number to be assigned is indicated by this flag as in use, the router will skip that number and use the next number that is not in use. If this skip occurs during the prediction process, the process will fail. Finally, some routers use a queue of unused port numbers. When a port number is assigned it is removed from the queue, when the number is no longer used, it is put back onto the queue. The queue tends to randomize the manner in which the port numbers are assigned so that port prediction with this latter type of router is difficult, if not impossible.

In order to increase the chances of success with the prediction, the time to complete the prediction can be reduced thereby reducing the possibility that another endpoint can cause the router to make a port assignment during the prediction process. In addition, more data packet transmissions can be used so that more than one prediction can be made. For example, a prediction can be made not only of the next port to be assigned but the next three or four ports. By examining these additional predictions, the gateway can decide whether a jump or skip in the port assignments has occurred, as discussed above. The prediction process is described in more detail in an article entitled "Symmetric NAT Transversal Using STUN", Y. Takeda, Panasonic Communications Research Laboratory, June 2003 and RFC 3489, both of which are incorporated by reference in their entirety. In general, a prediction success rate of about 80% can be expected.

Assume that this predicted port is port 230 on NAT router 226. The gateway 220 will then perform steps 310, 312, 318 and 320, which are equivalent to steps 302-308 performed on the host computer, on the client computer 204 to predict a port, for example port 208, that will be the next port used on the firewall 206. When steps 310, 312, 318 and 320 are complete, the gateway 220 has information concerning the public network addresses used by the host computer 234 and the client computer 204, and it also has predictions of the port number that will be used for outgoing UDP data packets transmitted from the client computer 204 and the host computer 234.

In step 322, the gateway sends this information to both the client computer 204 and the host computer 234. Next, in step 324, when it receives the information from the gateway 220, the client computer 204 will attempt to send a UDP data packet to the public network address and the predicted port 230 of the host computer 234. If the port prediction of the gateway is correct, this UDP packet will be sent from network address and the predicted port 208 of the firewall 206.

Simultaneously, as set forth in step 326, the host computer 234 will also attempt to send a UDP data packet to the public network address and predicted port of the client. Again, if the port prediction of the gateway is correct, this UDP packet will be sent from network address and the predicted port 230 of the NAT router 226. If both predictions regarding the source ports were correct, one of the data packets might still be discarded by the receiving party's firewall or NAT router if the outgoing packet arrived later than the incoming packet was sent. However, the firewall of router that sent the packet will store the fact that a packet has been sent from a particular source address and source port to a specified destination address and destination port. The data packet traveling in the other direction will then arrive at this firewall or router at the source address and source port from the destination address and destination port. The process then proceeds, via off-page connectors 328 and 330, to step 332.

Due to the nature of the UDP protocol, firewalls and NAT routers usually allow responses to UPD packets if they determine that the communication was initiated by a device on the internal network. This determination is made by determining at which address and port that response packet arrived and by examining the source network address and port in the response packet. In particular, the response packet would be expected to arrive at the source address and source port from the destination address and destination port. Consequently, the firewall or router will interpret the data packet arriving from the other computer as a response to the packet that it just sent and will signal the recipient of the packet that a UDP communications channel has been established. The recipient is then free to respond to this packet and both firewalls or NAT routers will allow the communication to take place. The result is a UDP connection between the client computer 204 and the host computer 234 via the firewall 206 and the NAT router 226. This connection is illustrated as arrows 219, 221 and 225.

In step 332 a determination is made whether a UDP connection has been established. Due to packet transit latencies between the client and host computers and their respective firewalls or NAT routers, transit latencies between the two firewalls/NAT routers, and the generally unreliable nature of UDP service, it is possible that neither or both packets will arrive at their destinations. If both packets arrive successfully, they are both consistent with the same UDP connection and that connection will be established. However, if both packets are lost, the predicted ports are still assumed to be correct and a retransmission of UDP packets will take place.

If a UDP connection has been established as determined in step 332, the process proceeds to step 334. Although the UDP service can be used to establish a connection, it is not adequately reliable and adaptable for use in the remote access session. In particular, it is desirable to use a protocol that can dynamically adapt to available bandwidth, detect and retransmit lost packets, and accommodate out-of-order packets that are consistent with UDP service. Consequently, as set forth in step 334, once the client computer 204 and the host computer 234 are able to communicate with each other via the UDP connection, a more reliable protocol, such as Transmission Control Protocol (TCP) can be implemented via the UDP packets by building a TCP-like layer on top of the UDP service in a conventional fashion. The process then ends in step 338.

In some embodiments, authentication and encryption must also take place. In particular, since both the client computer 204 and the host computer 234 both initiated connections to the gateway 220, they can both trust the gateway 220, but they cannot be sure that the entity on the other end of the UDP connection is, in fact, the party with which they wish to communicate. The connection can be secured by first ensuring that the connections between the client computer 204 and the gateway 220 (indicated by arrows 216, 217 and 218) and between the host computer 234 and the gateway 220 (indicated by arrows 222, 223 and 224) are secure. This can be accomplished by conventional means. The UDP channel can be authenticated by encrypting the individual UDP packets that are used to mediate and open the UDP connection and entrusting the gateway to issue the encryption keys over the pre-existing secured channels between the gateway 200 and the client and host computers, 204 and 234, respectively. The now authenticated UDP channel can then be encrypted using SSL or a similar mechanism.

In the event that a UDP connection is impossible to set up as determined in step 332, the gateway 220 also provides a fallback mechanism that, as set forth in step 336, simply forwards data between the client computer 204 and the host computer 234 in a manner similar to conventional systems that forward all data passing between the client and host computers. The process then ends in step 338.

In another embodiment, in addition to trying to establish a UDP communications channel, the gateway 220 can also control both the client computer 204 and the host computer 234 to attempt a more reliable direct connection, such as a TCP connection. This more reliable direct connection is only attempted, if the gateway 220 determines to a reasonable certainty that the client computer 204 and the host computer 234 are both capable of such communication, that is, there is a reasonable chance that they are not protected by a NAT router from each other. Such is the case when the public network addresses of both the client and the host are equal. This usually signifies that the parties are behind the same NAT router or firewall, and are therefore on the same LAN. Also, if a computer has a private network address that is identical to its public network address, it usually means that the computer in question is not behind a NAT router or a firewall, and can therefore be contacted directly from the Internet.

If a direct connection cannot be established because either the host computer 234 or the client computer 204 is behind a NAT router, the gateway 220 will then determine whether the NAT router is a Universal Plug-n-Play (UPNP) capable NAT router. If so, the gateway 220 can use the UPNP interface to ask the respective computer to attempt to open a port on the NAT router temporarily, until it is determined if a direct TCP connection can be established.

In still another embodiment, in order to minimize wait time for the user (time that is spent waiting successfully, or unsuccessfully, to establish the initial UDP connection) and maximize the success rate of establishing the UDP connection, the gateway 220 can begin forwarding data between the client computer 204 and the host computer 234 over the existing connections (216, 217, 218 and 222, 223, 244) as discussed above. Once the client computer 204 and the host computer 234 are communicating by forwarding data through the gateway, the gateway 220 can try to establish the UDP connection between the client and host in the background without disturbing the existing communication. If a UDP connection is successfully established, communication between the host computer 234 and the client computer 204 is shifted from the forwarding connection to the new UDP connection and the forwarded connection is closed. Since attempts to establish the UDP connection happen in the background, they can be repeated indefinitely until the peer-to-peer channel is successfully established.

A software implementation of the above-described embodiment may comprise a series of computer instructions either fixed on a tangible medium, such as a computer readable media, for example, a diskette, a CD-ROM, a ROM memory, or a fixed disk, or transmittable to a computer system, via a modem or other interface device over a medium. The medium either can be a tangible medium, including but not limited to optical or analog communications lines, or may be implemented with wireless techniques, including but not limited to microwave, infrared or other transmission techniques. It may also be the Internet. The series of computer instructions embodies all or part of the functionality previously described herein with respect to the invention.

Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, pre-loaded with a computer system, e.g., on system ROM or fixed disk, or distributed from a server or electronic bulletin board over a network, e.g., the Internet or World Wide Web.

Although an exemplary embodiment of the invention has been disclosed, it will be apparent to those skilled in the art that various changes and modifications can be made which will achieve some of the advantages of the invention without departing from the spirit and scope of the invention. For example, it will be obvious to those reasonably skilled in the art that, in other implementations, protocols and translations different from those shown may be performed. Other aspects, such as the specific process flow and the order of the illustrated steps, as well as other modifications to the inventive concept are intended to be covered by the appended claims.

What is claimed is:

1. An Internet-accessible gateway to facilitate communications between a client computer and a host computer, comprising:
    a processor;
    code executed by the processor to perform the following method steps:
        transferring commands and data through a communication path between the host computer and the client computer through the gateway to initiate a remote access operation with respect to the host computer;
        attempting to establish a peer-to-peer connection associated with the client computer and the host computer so that further commands and data associated with the remote access operation can be sent between the client computer and host computer directly instead of over the communication path, where the peer-to-peer connection is attempted to be established by performing the following sub-steps at the gateway:
            instructing the host computer and the client computer to each transmit a plurality of UDP data packets to different external network addresses;
            based on the responses to the UDP data packets, predicting a port that the host will use to transmit a future data packet, and predicting a port that the client computer will use to transmit a future data packet;
            based at least in part on the predicted ports, attempting to establish a UDP connection associated with the host computer and the client computer; and
        after the UDP connection is established, attempting to establish a TCP-based connection layer over the UDP connection for transfer of further commands and data associated with the remote access operation.

2. The Internet-accessible gateway as described in claim 1 wherein, if and when the peer-to-peer connection has been established, transmitting the further commands and data associated with the remote access operation over the peer-to-peer connection associated with the client computer and the host computer instead of over the communication path through the Internet-accessible gateway.

3. The Internet-accessible gateway as described in claim 2 wherein, if the peer-to-peer connection cannot be established, the remote access operation is still carried out over the communication path.

4. The Internet-accessible gateway as described in claim 1 wherein the method further includes encrypting at least some of the UDP data packets.

5. The Internet-accessible gateway as described in claim 1 wherein the remote access operation is a remote control operation.

6. The Internet-accessible gateway as described in claim 1 wherein the attempt to establish the peer-to-peer connection is repeated one or more times until the peer-to-peer connection is successfully established.

7. The Internet-accessible gateway as described in claim 1 wherein the UDP connection is also based on the public network address used by one of: the host computer, and the client computer.

\* \* \* \* \*